(12) United States Patent
Howard et al.

(10) Patent No.: US 9,856,803 B2
(45) Date of Patent: Jan. 2, 2018

(54) NATURAL GAS ENGINE SYSTEM WITH IMPROVED TRANSIENT RESPONSE

(71) Applicant: Caterpillar Inc., Peoria, IL (US)

(72) Inventors: Jeff Howard, West Lafayette, IN (US); Timothy B. James, Lafayette, IN (US); Todd A. Rezac, Whitestown, IN (US); Brett A. Zook, Cutler, IN (US); David J. Lin, Peoria, IL (US); Gary Boyer, Lafayette, IN (US); Robert Maxson, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 179 days.

(21) Appl. No.: 14/851,129

(22) Filed: Sep. 11, 2015

(65) Prior Publication Data

US 2017/0074183 A1 Mar. 16, 2017

(51) Int. Cl.
*F02B 33/44* (2006.01)
*F02D 41/00* (2006.01)
(Continued)

(52) U.S. Cl.
CPC ............ *F02D 41/0027* (2013.01); *B60K 3/00* (2013.01); *F02B 21/00* (2013.01); *F02B 37/02* (2013.01);
(Continued)

(58) Field of Classification Search
CPC ...... F02D 41/0027; F02B 21/00; F02B 37/02; F02B 43/10; F02B 63/04; F02B 2043/103
(Continued)

(56) References Cited

U.S. PATENT DOCUMENTS

| 3,673,796 A | 7/1972 | Weick et al. |
| 4,019,323 A | 4/1977 | Zuhn |

(Continued)

FOREIGN PATENT DOCUMENTS

| CN | 102128079 A | 2/2011 |
| CN | 203515867 U | 11/2013 |

(Continued)

OTHER PUBLICATIONS

G. Papalambrou, E. Karlis, N. Kyratatos, "Compressed Air Injection in the Intake Manifold of a Diesel Engine to improve Transient Load Uptake Experimental Investigation," The Second LRF-NTUA Center of Excellence Workshop on Ship Total Energy-Emissions-Economy, Feb. 13, 2015 (20 pages).

(Continued)

*Primary Examiner* — Thai Ba Trieu

(57) ABSTRACT

A natural gas engine system may have an engine having at least one cylinder. The engine may also have an intake manifold configured to deliver air for combustion to the cylinder and an exhaust manifold configured to discharge exhaust from the cylinder. The natural gas engine system may have a generator coupled to the engine. The generator may be configured to generate electrical power for an electrical load. The natural gas engine system may have a fuel source configured to supply natural gas for combustion in the engine, and an air tank in fluid communication with the intake manifold and the exhaust manifold. Further, the natural gas engine system may have a controller. The controller may be configured to direct a first amount of air from the air tank to the exhaust manifold and a second amount of air from the air tank to the intake manifold.

1 Claim, 2 Drawing Sheets

(51) Int. Cl.
*F02B 63/04* (2006.01)
*F02B 43/10* (2006.01)
*F02B 21/00* (2006.01)
*F02B 37/02* (2006.01)
*B60K 3/00* (2006.01)
*F02B 37/10* (2006.01)
*F02D 41/10* (2006.01)

(52) U.S. Cl.
CPC .............. *F02B 37/10* (2013.01); *F02B 43/10* (2013.01); *F02B 63/04* (2013.01); *F02D 41/0007* (2013.01); *F02B 2043/103* (2013.01); *F02D 41/10* (2013.01); *Y02T 10/144* (2013.01); *Y02T 10/32* (2013.01)

(58) Field of Classification Search
USPC ..................................... 60/606, 607–608, 611
See application file for complete search history.

(56) References Cited

U.S. PATENT DOCUMENTS

| | | | |
|---|---|---|---|
| 5,064,423 A | | 11/1991 | Lorenz et al. |
| 6,408,625 B1* | | 6/2002 | Woon .................. F02D 41/0007 60/606 |
| 6,826,910 B1* | | 12/2004 | Easton ...................... F02G 1/00 60/597 |
| 7,975,666 B2 | | 7/2011 | Gokhale et al. |
| 8,069,665 B2* | | 12/2011 | Pursifull ................ F02B 21/00 60/611 |
| 8,371,276 B2* | | 2/2013 | Pursifull ............. F02D 41/0007 123/336 |
| 8,434,305 B2 | | 5/2013 | Donkin et al. |
| 8,528,332 B2 | | 9/2013 | Pursifull et al. |
| 8,534,065 B2 | | 9/2013 | Pursifull et al. |
| 8,567,191 B2 | | 10/2013 | Geyer |
| 8,666,634 B2 | | 3/2014 | Schaffeld et al. |
| 8,713,938 B2* | | 5/2014 | Pursifull ............. F02D 41/0002 60/611 |
| 8,726,891 B2* | | 5/2014 | Pursifull ............. F02D 41/0007 123/399 |
| 8,931,273 B2 | | 1/2015 | Rollinger et al. |
| 9,234,469 B2* | | 1/2016 | Pursifull ............. F02D 41/0002 |
| 2008/0016864 A1 | | 1/2008 | Andersen |
| 2008/0133110 A1 | | 6/2008 | Vetrovec |
| 2011/0174281 A1 | | 7/2011 | Malm |
| 2011/0179779 A1 | | 7/2011 | Falkowski et al. |
| 2012/0024267 A1 | | 2/2012 | Pursifull et al. |

FOREIGN PATENT DOCUMENTS

| | | |
|---|---|---|
| DE | 3737743 A1 | 5/1989 |
| EP | 2749751 | 7/2014 |
| WO | WO 2007/060274 A1 | 5/2007 |
| WO | WO 2013/175238 A1 | 11/2013 |

OTHER PUBLICATIONS

D. Cieslar, N. Collings, P. Dickinson, K. Glover, "A Novel System for Reducing Turbo-Lag by Injection of Compressed Gas into the Exhaust Manifold," SAE International, Apr. 8, 2013 (8 pages).

D. Cieslar, "Control for Transient Response of Turbocharged Engines," Ph.D. Thesis, Mar. 2013 (211 pages).

* cited by examiner

NATURAL GAS ENGINE SYSTEM WITH IMPROVED TRANSIENT RESPONSE

TECHNICAL FIELD

The present disclosure relates generally to a natural gas engine system and, more particularly, to a natural gas engine system with an improved transient response.

BACKGROUND

Natural gas powered internal combustion engines have found use in a variety of applications, for example, in generator sets that serve as primary or backup sources of electrical power. Natural gas engines also find increasingly widespread use in marine, off-highway, and locomotive applications. In particular, natural gas engines have become attractive because of their reduced emissions, smaller footprint, and relatively lower cost of operation and maintenance compared with gasoline or diesel engines. Because of the smaller engine size, however, natural gas engines may not respond to transient power demands as effectively as their gasoline or diesel powered counterparts.

One possible solution to improve the transient response capability of a natural gas engine includes using a larger displacement engine. Using a larger engine, however, increases the cost of operating and maintaining the engine, offsetting some of the cost advantages associated with the use of the smaller spark-ignited natural gas engines. Therefore, it is desirable to improve the transient response of natural gas engines to enable these engines to adequately respond to sudden and transient changes in their required power output.

SAE publication titled "A Novel System for Reducing Turbo-Lag by Injection of Compressed Gas into the Exhaust Manifold" of Cieslar et al., was published on Apr. 8, 2013 ("SAE publication"). This SAE publication discloses an exhaust assist system for improving the transient response of internal combustion engines. In the system disclosed in the SAE publication, compressed air from a reservoir is injected into the exhaust manifold of an engine to accelerate the turbocharger in situations where the engine is suddenly required to meet a higher torque output. The SAE publication discloses that its exhaust assist system is superior to intake assist systems, which inject compressed air into the intake manifold. In particular, the SAE publication points to the well-known problem of compressor surge caused when the injected compressed air enters the compressor instead of entering the combustion chambers of the engine.

Although the SAE publication discloses a system for accelerating the turbocharger to meet a sudden increase in load on the engine, the system may still be less than optimal. In particular, the disclosed system only uses the compressed air to accelerate the turbocharger. To supply sufficient power for the increased load on the engine, however, typically additional fuel is injected into the combustion chambers of the engine. In the disclosed system, however, even after acceleration using compressed air, the turbocharger compressor may not be able to supply sufficient air to combust the extra fuel, causing the engine to develop less than the required power output. This may be especially true in generator set operations where the engine may have to start from a cold start condition and deliver the desired torque output to a generator in case of a sudden and near instantaneous demand for electrical power.

The natural gas engine system of the present disclosure solves one or more of the problems set forth above and/or other problems of the prior art.

SUMMARY

In one aspect, the present disclosure is directed to a natural gas engine system. The natural gas system may include an engine. The engine may include at least one cylinder. The engine may also include an intake manifold configured to deliver air for combustion to the cylinder. Further, the engine may include an exhaust manifold configured to discharge exhaust from the cylinder. The natural gas engine system may include a generator coupled to the engine. The generator may be configured to generate electrical power for an electrical load. The natural gas engine system may include a fuel source configured to supply natural gas for combustion in the engine. The natural gas engine system may include an air tank in fluid communication with the intake manifold and the exhaust manifold. Further, the natural gas engine system may include a controller. The controller may be configured to direct a first amount of air from the air tank to the exhaust manifold. The controller may also be configured to direct a second amount of air from the air tank to the intake manifold.

In another aspect, the present disclosure is directed to a method of operating a natural gas engine generator set having a generator and an engine coupled to the generator. The method may include determining a status of a transfer switch coupling the generator to an electrical load. The method may also include determining a target engine parameter, when the transfer switch is closed. Further, the method may include determining, using a controller, a target amount of fuel based on the target engine parameter. The method may also include determining a first amount of air required to drive a turbocharger associated with the engine based on the target engine parameter. In addition, the method may include determining a second amount of air for combustion of the amount of fuel in the engine. The method may include delivering the amount of fuel to the engine from a fuel source. The method may further include directing the first amount of air from an air tank to an exhaust manifold of the engine. The method may also include directing the second amount of air from the air tank to the intake manifold of the engine.

In yet another aspect, the present disclosure is directed to a natural gas engine. The natural gas engine may include a plurality of cylinders. The natural gas engine may also include an intake manifold configured to deliver air for combustion to the cylinders. The natural gas engine may further include an exhaust manifold configured to discharge exhaust from the cylinders. The natural gas engine may include a fuel source configured to supply natural gas for combustion in the cylinders. In addition, the natural gas engine may include an air tank in fluid communication with the intake manifold and the exhaust manifold. The natural gas engine may also include a controller. The controller may be configured to direct a first amount of air from the air tank to the exhaust manifold. The controller may also be configured to direct a second amount of air from the air tank to the intake manifold. The natural gas engine may include a turbocharger. The turbocharger may include a turbine stage configured to be driven by at least one of the exhaust and the first amount of air. The turbocharger may also include a compressor stage coupled to the turbine stage. The compressor stage may be configured to direct a third portion of the air from the ambient to the intake manifold.

DETAILED DESCRIPTION

Figure 1:
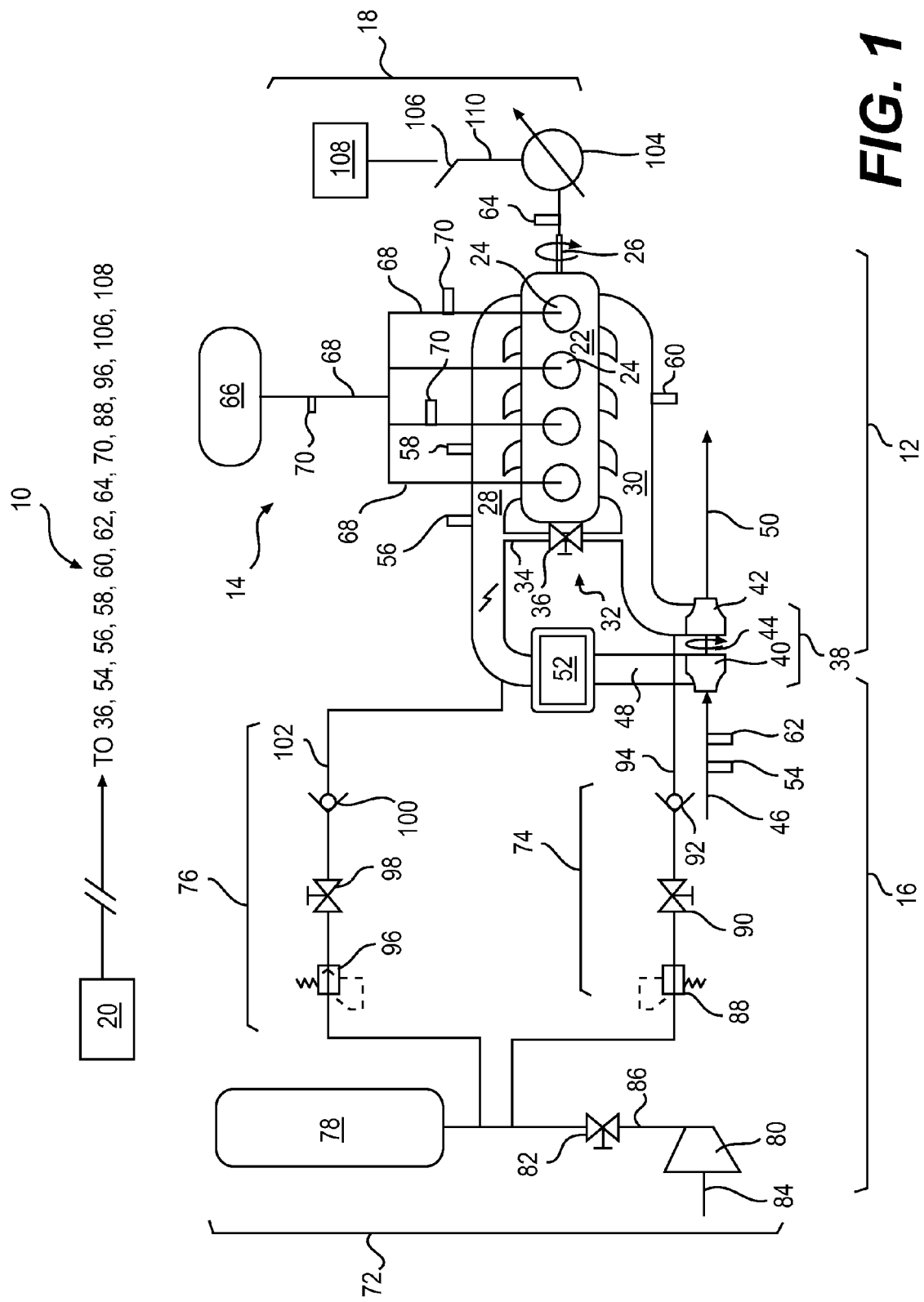
FIG. 1 is an illustration of an exemplary disclosed natural gas engine system.

FIG. 1 illustrates an exemplary engine system 10, which may be used in an application such as auxiliary or backup power generation, marine, mining, construction, farming, railroad, or another industry known in the art. Engine system 10 may include engine 12, fuel system 14, air injection system 16, generator arrangement 18, and controller 20. Engine 12 may be any type of engine such as, for example, a spark-ignited gaseous fuel-powered engine, a diesel engine, a gasoline engine, a dual-fuel engine, etc. In one exemplary embodiment, engine 12 may be a gaseous-fuel-powered engine, using natural gas as fuel. Engine 12 may include cylinder block 22, which may include one or more cylinders 24. In one exemplary embodiment, as illustrated in FIG. 1, cylinder block 22 may include four cylinders 24 disposed in an "in-line" configuration. It is contemplated, however, that cylinder block 22 may include any number of cylinders 24, which may be disposed in a "V" configuration, or in any other suitable configuration. Each engine cylinder 24 may include a reciprocating piston (not shown) connected to a crankshaft 26. Combustion of fuel within engine cylinders 24 may cause the pistons to reciprocate and rotate crankshaft 26 to generate a torque and/or power output from engine 12.

Engine 12 may include intake manifold 28, which may be in fluid communication with the one or more cylinders 24. Intake manifold 28 may be configured to direct fresh air to cylinders 24 for combustion of fuel within cylinders 24. Engine 12 may also include exhaust manifold 30, which may be in fluid communication with cylinders 24. Exhaust manifold 30 may be configured to discharge exhaust from cylinders 24. Engine 12 may include exhaust gas recirculation (EGR) arrangement 32. EGR arrangement 32 may include passageway 34 and EGR valve 36. Passageway 34 may connect exhaust manifold 30 with intake manifold 28 to direct a portion of the exhaust from exhaust manifold 30 to intake manifold 28. EGR valve 36 may regulate a flow of exhaust in passageway 34. For example, EGR valve 36 may selectively direct the portion of the exhaust from exhaust manifold 30 to intake manifold 28 via passageway 34. The mixture of air and the portion of exhaust in intake manifold 28 may enter cylinders 24 during a subsequent combustion cycle.

Engine 12 may include turbocharger 38, which may include compressor stage 40 and turbine stage 42. Shaft 44 may connect compressor stage 40 and turbine stage 42. Compressor stage 40 may embody a fixed geometry compressor configured to compress air received from an ambient to a predetermined pressure level. For example, as illustrated in FIG. 1, compressor stage 40 may receive air from the ambient via passageway 46. Compressor stage 40 may compress the air and deliver the compressed air to intake manifold 28 via passageway 48.

Turbine stage 42 may include a turbine wheel (not shown) attached to shaft 44. As the exhaust exiting exhaust manifold 30 moves through turbine stage 42, the exhaust may rotate the turbine wheel, which in turn may drive compressor stage 40 via shaft 44. One of ordinary skill in the art would recognize that a rotational speed of compressor stage 40, which may determine an amount of compressed air that compressor stage 40 can deliver to engine 12, may be governed by a rotational speed at which turbine stage 42 can drive compressor stage 40. After travelling through turbine stage 42 the exhaust may be directed to the ambient via passageway 50. Although not shown in FIG. 1, it is contemplated that engine system 10 may include one or more after-treatment components in passageway 50 to treat the exhaust before discharging the exhaust to the ambient.

Engine 12 may include intercooler 52 disposed in passageway 48 between compressor stage 40 and intake manifold 28. Intercooler 52 may be configured to cool the compressed air exiting compressor stage 40 before delivering the cooled and compressed air to intake manifold 28. Intercooler 52 may embody air-to-air heat exchangers, air-to-liquid heat exchangers, or combinations of both, and be configured to facilitate the transfer of thermal energy away from the compressed air received from compressor stage 40. The thermal energy transferred away from the compressed air may be absorbed into a flow of low-pressure coolant, for example, air, glycol, water, a water/glycol mixture, a blended air mixture, or another coolant known in the art. It is contemplated that additional components may be included within engine 12, if desired, such as valving, one or more air cleaners, one or more waste gates, a bypass circuit, and other means for conditioning and introducing charged air to cylinders 24 and for discharging the exhaust from cylinders 24 to the ambient.

Engine 12 may include multiple sensors configured to detect operating parameters of engine 12. The sensors may include, for example, temperature sensors 54, 56, pressure sensors 58, 60, flow sensor 62, and speed sensor 64. Temperature sensor 54 may be disposed within passageway 46 and may be configured to determine a temperature of air entering compressor stage 40. Likewise, temperature sensor 56 may be disposed in intake manifold 28 and may be configured to determine a temperature of the compressed air entering cylinders 24 from intake manifold 28. Temperature sensors 54, 56, may include diode thermometers, thermistors, thermocouples, infrared sensors, or any other types of temperature sensors known in the art.

Pressure sensor 58 may be disposed within intake manifold 28 and may be configured to determine a pressure of the air in intake manifold 28. Likewise, pressure sensor 60 may be disposed in exhaust manifold 30 and may be configured to determine a pressure of the exhaust in exhaust manifold 30. Pressure sensors 58, 60 may include piezoresistive strain gages, capacitive elements, piezoelectric type sensors, displacement type sensors, or any other types of pressure sensors known in the art. Flow sensor 62 may be disposed in passageway 46 and may be configured to determine an air flow rate in passageway 46. Flow sensor 62 may include hot or cold wire sensors, orifice sensors, vane sensors, membrane sensors, pressure difference based sensors, or any other type of flow sensors known in the art.

Speed sensor 64 may be disposed on or adjacent crankshaft 26 and may be configured to determine a rotational speed of crankshaft 26. Speed sensor 64 may embody a conventional rotational speed detector having a stationary element rigidly connected to cylinder block 22 (referring to FIG. 1) that is configured to sense a relative rotational movement of crankshaft 26. The stationary element may be a magnetic or optical element configured to detect the rotation of an indexing element (e.g., a toothed tone wheel, an embedded magnet, a calibration stripe, teeth of a timing gear, a cam lobe, etc.) connected to, embedded within, or otherwise forming a portion of crankshaft 26. Speed sensor 64 may be located adjacent the indexing element and configured to generate a signal each time the indexing element (or a portion thereof, for example, a tooth) passes near the stationary element. Rotational speed of crankshaft 26 may be determined based on the signals generated by speed sensor 64. Other types of sensors and/or strategies may also or alternatively be employed to determine a rotational speed of crankshaft 26.

Although FIG. 1 illustrates only temperature sensors 54, 56, pressure sensors 58, 60, flow sensor 62, and speed sensor 64, it is contemplated that engine system 10 may include any number of temperature sensors 54, 56, pressure sensors 58, 60, flow sensor 62, and speed sensor 64. It is also contemplated that engine system 10 may include any number of additional flow sensors, temperature sensors, pressure sensors, flow sensors, emissions sensors, and/or any type of other sensors known in the art for determining the operational parameters associated with engine system 10.

Fuel system 14 may be configured to supply fuel to cylinders 24 for combustion within cylinders 24. Fuel system 14 may include components that cooperate to deliver pressurized fuel to each cylinder 24. Specifically, fuel system 14 may include fuel source 66 configured to supply fuel, a fuel pumping arrangement (not shown), and one or more passageways 68 configured to deliver fuel from fuel source 66 to cylinders 24. Fuel source 66 may be a reservoir configured to store liquid or gaseous fuel or a pipe line, which may supply the liquid or gaseous fuel. In one exemplary embodiment, fuel source 66 may store liquid natural gas for combustion within cylinders 24. The pumping arrangement of fuel system 14 may include one or more fuel pumps, filters, valves, regulators, fuel injectors, and any other components known in the art for injecting pressurized gaseous fuel into cylinders 24. Fuel system 14 may also include one or more fuel flow sensors 70, which may be configured to determine a flow rate of fuel being supplied to cylinders 24. Although FIG. 1 illustrates gaseous fuel from fuel source 66 being delivered to cylinders 24, it is contemplated that gaseous fuel from fuel source 66 may instead be delivered to intake manifold 28. It is also contemplated that liquid fuel or a mixture of liquid and gaseous fuel may be delivered from fuel source 66 to cylinders 24 and/or intake manifold 28.

Air injection system 16 may include air storage arrangement 72, intake injection arrangement 76, and exhaust injection arrangement 74. Air storage arrangement 72 may include air tank 78, compressor 80, and control valve 82. Air tank 78 may include an accumulator configured to accumulate and store compressed air. Alternatively, air tank 78 may include a reservoir capable of storing compressed air. In one exemplary embodiment, a pressure of air within air tank 78 may range between about 150 to about 200 psi. As used in this disclosure, the term "about" may indicate typical manufacturing tolerances and rounding. Thus, for example, the term "about" may represent a pressure variation of ±5 psi from a nominal value. Compressor 80 may be configured to receive air from the ambient via passageway 84, compress the air, and deliver the compressed air to air tank 78 via passageway 86. Compressor 80 may be driven by engine 12 or by an external power source, for example, an electric motor, a compression-ignition or spark-ignition engine different from engine 12, or by any other type of prime mover known in the art. Control valve 82 may be disposed in passageway 86 and may be configured to selectively direct compressed air from compressor 80 to air tank 78 via passageway 86.

Exhaust injection arrangement 74 may be configured to deliver a first amount of air from air tank 78 to exhaust manifold 30. Exhaust injection arrangement 74 may include pressure regulator 88, control valve 90, and check valve 92, all of which may be disposed along passageway 94 connecting air tank 78 to exhaust manifold 30. Pressure regulator 88 may be disposed in passageway 94 between air tank 78 and exhaust manifold 30. Pressure regulator 88 may be configured to reduce a pressure of compressed air received from air tank 78 from a first pressure within air tank 78 to a second pressure of the first amount of air in passageway 94. Second pressure may be lower than first pressure and higher than or about equal to a third pressure within exhaust manifold 30. In one exemplary embodiment, the pressure within exhaust manifold 30 may range from about 50 to about 80 psi. In another exemplary embodiment, a ratio of the first pressure within air tank 78 and the second pressure within passageway 94 may range between about 4:1 to 10:1.

Control valve 90 may be disposed between air tank 78, and exhaust manifold 30 and may be configured to selectively direct compressed air from air tank 78 to exhaust manifold 30 via passageway 94. In one exemplary embodiment as illustrated in FIG. 1, control valve 90 may be disposed between pressure regulator 88 and exhaust manifold 30. Check valve 92 may be disposed between air tank 78 and exhaust manifold 30 and may be configured to reduce and/or eliminate reverse flow of air from exhaust manifold 30 to air tank 78 via passageway 94. In one exemplary embodiment as illustrated in FIG. 1, check valve 92 may be disposed between control valve 90 and exhaust manifold 30. Pressure regulator 88, control valve 90, and check valve 92 may cooperate to direct the first amount of air from air tank 78 to exhaust manifold 30. Although only one each of pressure regulator 88, control valve 90, and check valve 92 are illustrated in FIG. 1, it is contemplated that exhaust injection arrangement 74 may include any number of pressure regulators 88, control valves 90, and check valves 92. It is also contemplated that exhaust injection arrangement 74 may include one or more other components such as filters, heaters, coolers, flow guides, pressure sensors, temperature sensors, flow sensors, etc.

Intake injection arrangement 76 may be configured to deliver a second amount of air from air tank 78 to intake manifold 28. Intake injection arrangement 76 may include pressure regulator 96, control valve 98, and check valve 100, all of which may be disposed along passageway 102, which may connect air tank 78 to intake manifold 28. Pressure regulator 96 may be disposed in passageway 102 between air tank 78 and intake manifold 28. Pressure regulator 96 may be configured to reduce a pressure of compressed air received from air tank 78 from the first pressure within air tank 78 to a fourth pressure of the second amount of air in passageway 102. Fourth pressure may be smaller than the first pressure and greater than or equal to a fifth pressure within intake manifold 28. In one exemplary embodiment, second pressure of the first amount of air within passageway 94 may be larger than fourth pressure of the second amount of air within passageway 102. In another exemplary embodiment, intake manifold 28 may range from about 30 to about 40 psi. In yet another exemplary embodiment, a ratio of the first pressure within air tank 78 and the fourth pressure within passageway 102 may range between about 4:1 and 5:1.

Control valve 98 may be disposed between air tank 78 and intake manifold 28 and may be configured to selectively direct compressed air from air tank 78 to intake manifold 28 via passageway 102. In one exemplary embodiment as illustrated in FIG. 1, control valve 98 may be disposed between pressure regulator 96 and intake manifold 28. Check valve 100 may be disposed between air tank 78 and intake manifold 28 and may be configured to reduce and/or eliminate reverse flow of air from intake manifold 28 to air tank 78 via passageway 102. In one exemplary embodiment as illustrated in FIG. 1, check valve 100 may be disposed between control valve 98 and intake manifold 28. Pressure regulator 96, control valve 98, and check valve 102 may cooperate to direct the second amount of air from air tank 78 to intake manifold 28. Although only one each of pressure regulator 96, control valve 98, and check valve 102 are illustrated in FIG. 1, it is contemplated that intake injection arrangement 76 may include any number of pressure regulators 96, control valves 98, and check valves 102. It is also contemplated that intake injection arrangement 76 may include one or more other components, such as filters, heaters, coolers, flow guides, pressure sensors, temperature sensors, flow sensors, etc. Although FIG. 1 illustrates passageway 102 as delivering the second amount of air to intake manifold 28 between intercooler 52 and cylinder block 22, it is contemplated that passageway 102 may deliver the second amount of air into passageway 48 to allow intercooler 52 to cool the second amount of air.

Control valves 82, 90, and 98 may be two-position or proportional type valves having valve elements movable to regulate flows of compressed air through passageways 86, 94, and 102, respectively. The valve elements in control valves 82, 90, and 98 may be hydraulic, pneumatic, solenoid-operable, or electro-mechanically operable to move between a flow-passing position and a flow-blocking position. It is also contemplated that the valve elements in control valves 82, 90, and 98 may be operable in any other manner known in the art. In the flow-passing position, control valves 82, 90, and 98 may permit compressed air to flow through passageways 86, 94, and 102, respectively, substantially unrestricted by control valves 82, 90, and 98. In contrast, in the flow-blocking position, control valves 82, 90, and 98 may completely block compressed air from flowing through passageways 86, 94, and 102, respectively.

Torque output from engine 12 may be supplied to, for example, generator arrangement 18, via crankshaft 26. Generator arrangement 18 may include generator 104, transfer switch 106, and electrical load 108. In one exemplary embodiment as illustrated in FIG. 1, engine 12 may be coupled to generator 104 to mechanically drive generator 104, which in turn may generate electrical power for use by electrical load 108. Generator 104 may be, for example, an AC induction generator, a permanent-magnet generator, an AC synchronous generator, or a switched-reluctance generator. In one embodiment, generator 104 may include multiple pairings of poles (not shown), each pairing having three phases arranged on a circumference of a stator (not shown) to produce an alternating current with a frequency of 50 and/or 60 Hz. Electrical power produced by generator 104 may be directed to electrical load 108 by way of one or more generator bus bars 110.

Transfer switch 106 may be disposed between generator 104 and electrical load 108. Transfer switch 106 may be communicatively connected to the one or more bus bars 110 to selectively supply electrical power to electrical load 108. Thus, for example, generator 104 may supply electrical power to electrical load 108 when transfer switch 106 is "closed." Contrarily, generator 104 may stop supplying electrical power to electrical load 108 when transfer switch 106 is "open." In one exemplary embodiment, transfer switch 106 may be a mechanical switch. In another exemplary embodiment, transfer switch 106 may embody a single microprocessor or multiple microprocessors that include a means for controlling the power supply from generator 104. Numerous commercially available microprocessors can be configured to perform the functions of transfer switch 106. It should be appreciated that transfer switch 106 could readily embody a general machine or power source microprocessor capable of controlling numerous machine or power source functions. Transfer switch 106 may include all the components necessary to perform the required system control such as, for example, a memory, a secondary storage device, and a processor, such as a central processing unit. One skilled in the art will appreciate that transfer switch 106 can contain additional or different components. Associated with transfer switch 106 may be various other known circuits such as, for example, power supply circuitry, signal conditioning circuitry, and solenoid driver circuitry, among others. It is also contemplated that transfer switch 106 may alternatively be manually actuated, if desired. Electrical load 108 may represent a variety of applications such as motors, lighting, electrical or electronic equipment, or any other type of electrically operated device or application know in the art.

Controller 20 may be in communication with temperature sensors 54, 56, pressure sensors 58, 60, flow sensor 62, speed sensor 64, fuel flow sensor 70, transfer switch 106, electrical load 108, pressure regulators 88, 96, control valves 82, 90, 98, and numerous other components of engine system 10. As discussed in detail below, controller 20 may be configured to control the first and the second amount of air flowing from air tank 78 to exhaust manifold 30 and intake manifold 28, respectively.

Controller 20 may embody a single microprocessor or multiple microprocessors that include a means for monitoring operations of engine system 10 and controlling the first and second amounts of air. For example, controller 20 may include a memory, a secondary storage device, a clock, and a processor, such as a central processing unit or any other means for accomplishing a task consistent with the present disclosure. The memory or secondary storage device associated with controller 20 may store data, lookup tables, and/or routines that may assist controller 20 to perform its functions. Further, the memory or storage device associated with controller 20 may also store data received from the various sensors associated with engine system 10. Numerous commercially available microprocessors can be configured to perform the functions of controller 20. It should be appreciated that controller 20 could readily embody a general engine system controller capable of controlling numerous other engine system functions. Various other known circuits may be associated with controller 20, including signal-conditioning circuitry, communication circuitry, hydraulic or other actuation circuitry, and other appropriate circuitry.

Figure 2:
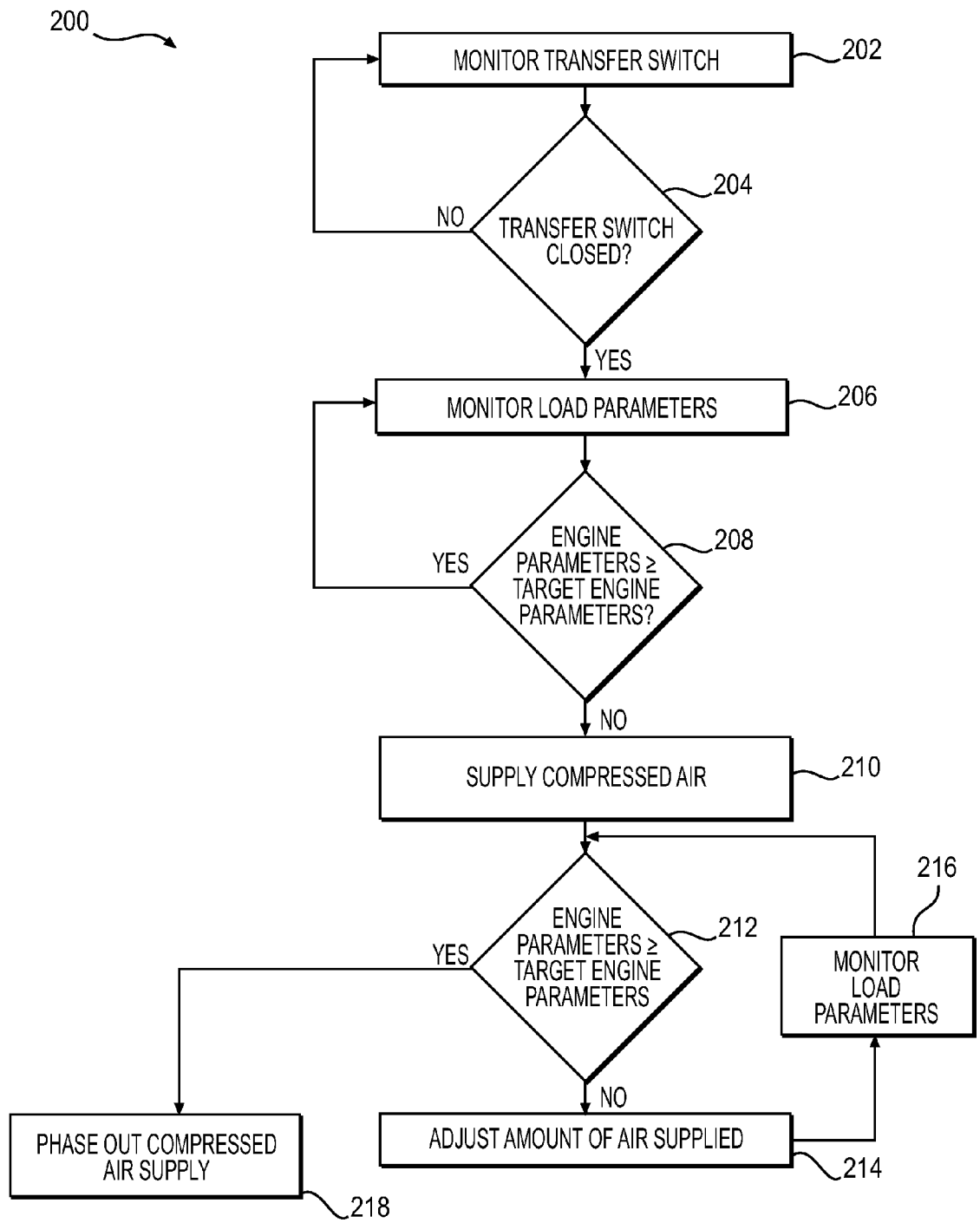
FIG. 2 is a flow chart showing an exemplary method of operating the natural gas engine system of FIG. 1.

FIG. 2 illustrates an exemplary method that may be performed by controller 20 of engine system 10. FIG. 2 will be discussed in more detail in the following section to further illustrate the disclosed concepts.

INDUSTRIAL APPLICABILITY

The disclosed engine system may be used in any engine configured to drive a generator for providing electricity for use with one or more electrical applications. For example, the disclosed engine system 10 may be used to drive generator 104 configured to provide backup electrical power to electrical load 108. When the primary electrical power supply to electrical load 108 is interrupted, engine 12 may be required to start from a cold-start condition to start driving generator 104, which may supply backup electrical power to electrical load 108. Alternatively, when electrical load 108 demands additional power that the primary electrical power supply cannot deliver, engine 12 may be required to start from a cold-start condition to start driving generator 104, which may supply additional electrical power to electrical load 108. As yet another example, when generator 104 is supplying backup electrical power to electrical load 108, engine 12 may have to respond to sudden increases or spikes in the electrical power demand by electrical load 108. For example, engine 12 may have to respond by increasing the torque output from crankshaft 26 to drive generator 104 at a higher speed to meet the additional power demand of electrical load 108. An exemplary method of operation of engine system 10 will now be described in detail with reference to FIGS. 1 and 2.

FIG. 2 illustrates an exemplary disclosed method 200 performed by controller 20 of engine system 10. Method 200 may include a step of monitoring transfer switch 106 (Step 202). For example, controller 20 may monitor transfer switch 106 to determine a status (closed vs. open) of transfer switch 106. Transfer switch 106 may be closed, for example, when electrical load 108 requires additional electrical power from generator 104 because of a failure of a primary electrical power source associated with electrical load 108, or because of an increase in power demand by electrical load 108. Controller 20 may monitor transfer switch 106 in many ways. For example controller 20 may monitor signals transmitted by transfer switch 106 to controller 20 to determine the status. Additionally or alternatively, for example, controller 20 may monitor a flow of current through transfer switch 106 or a voltage drop across transfer switch 106 to determine the status.

Method 200 may include a step of determining whether transfer switch 106 is closed (Step 204). When controller 20 determines that transfer switch 106 is open (Step 204: No), controller 20 may return to step 202 of monitoring transfer switch 106. When controller 20 determines, however, that transfer switch 106 is closed (Step 204: Yes), method 200 may proceed to step 206 of monitoring load parameters. Controller 20 may monitor load parameters in many ways (Step 206). For example, controller 20 may determine an amount of current required by electrical load 108. Additionally or alternatively, controller 20 may determine an amount of electrical power (in e.g. Kilowatts) required by electrical load 108. Controller 20 may determine target engine parameters for engine 12 based on the load parameters of electrical load 108. The target engine parameters for engine 12 may include, for example, a target rotational speed of crankshaft 26, a target torque output of crankshaft 26, a target power output of engine 12, etc., required to generate the current or electrical power demanded by electrical load 108.

Method 200 may include a step of determining whether the engine parameters meet or exceed the target engine parameters (Step 208). In one exemplary embodiment, the engine parameters may be less than the target engine parameters when, for example, engine 12 starts operating from a cold-start condition. Controller 20 may determine whether the engine parameters meet or exceed the target engine parameters by comparing, for example, a speed of crankshaft 26, a torque output of engine 12, a power output of engine 12 with the target speed, target torque output, or target power output, respectively, determined in step 206. It is contemplated, that controller 20 may determine the speed of crankshaft 26, torque output of engine 12, and/or power output of engine 12 based on signals received from one or more of temperature sensors 54, 56, pressure sensors 58, 60, flow sensor 62, speed sensor 64, fuel flow sensor 70, and/or from any other sensors of engine system 10. When controller 20 determines that the engine parameters meet or exceed the target engine parameters (Step 208: Yes), method 200 may return to step 206 of monitoring the load parameters. When controller 20 determines, however, that one or more engine parameters do not meet or exceed the target engine parameters (Step 208: No), controller 20 may proceed to step 210.

Method 200 may include a step of supplying compressed air from air tank 78 (Step 210). Controller 20 may determine a target amount of fuel that may be required to generate the target speed, target torque output, and/or target power output for engine 12 based on the one or more target engine parameters determined in, for example, step 206. Controller 20 may also determine a flow rate of air within intake manifold 28 based on signals received from one or more of temperature sensors 54, 56, pressure sensors 58, 60, flow sensor 62 and/or from any other sensors of engine system 10. Controller 20 may further determine whether the flow rate of air within intake manifold 28 is sufficient to combust the target amount of fuel.

Controller 20 may determine the first amount of compressed air required to accelerate turbine stage 42 to either start the turbocharger from a stopped condition or to drive the turbocharger at a higher speed. Controller 20 may also determine the second amount of compressed air required to make up a difference between a third amount of air supplied by compressor stage 40 and a total amount of air required to combust the target amount of fuel. Controller 20 may adjust control valve 90 to direct the first amount of air from air tank 78 to exhaust manifold 30. Controller 20 may additionally or alternatively adjust control valve 98 to direct the second amount of air from air tank 78 to intake manifold 28.

When engine 12 starts from a cold-start condition, turbocharger 38 may not be operational. Consequently compressor stage 40 may not be in a condition to deliver air to intake manifold 28. The first amount of compressed air may travel through exhaust manifold 30 and help drive turbine stage 42, which in turn may drive compressor stage 40 to deliver the third amount of air to intake manifold 28. The second amount of air may help ensure that sufficient air is available to combust the target amount of fuel to generate the target speed, target torque output, and/or target power output so that generator 104 may be able to meet the electrical power demand of electrical load 108. In particular, the second amount of air received from air tank 78 and the third amount of air received from compressor stage 40 may be directed by intake manifold 28 to cylinders 24 for combustion of the target amount of fuel. In one exemplary embodiment, the first amount of air may be greater than the second amount of air, for example, because the first amount of air may be required to accelerate turbine stage 42 from a cold-start condition whereas the second amount of air may only be needed to make up a shortfall in the amount of air available for combustion in cylinders 24.

Driving the turbine initially using the first amount of air may also help reduce compressor surge. For example, by only supplying the first amount of air initially to turbine stage 42, controller 20 may help ensure that compressor stage 40 can generate a sufficiently high pressure in passageway 48, which may help reduce or eliminate a flow of the second amount of air delivered into intake manifold 28 from flowing to compressor stage 40. Controller 20 may also help compensate for any shortfall in the amount of air delivered by compressor stage 40 by directing the second amount of air to intake manifold 28. Thus, by controlling the relative amounts of the first amount of air and the second amount of air, engine system 10 may help reduce or eliminate compressor surge and still supply sufficient amount of air for combustion in cylinders 24 to meet sudden increases in the power output required by generator arrangement 18.

Method 200 may include a step of determining whether the engine parameters meet or exceed the target engine parameters (Step 212). For example, controller 20 may perform processes similar to those discussed above with respect to step 208 to determine whether the engine parameters meet or exceed the target engine parameters. When controller 20 determines that one or more engine parameters do not meet or exceed the target engine parameters (Step 212: No), controller 20 may proceed to step 214 of adjusting the amount of air supplied from air tank 78. For example, controller 20 may perform processes similar to those discussed above with respect to step 210 to revise or update the first amount of air and the second amount of air required to ensure that sufficient air is available for combusting the target amount of fuel. Controller 20 may adjust control valve 90 to direct the first amount of air from air tank 78 to intake manifold 28. Controller 20 may additionally or alternatively adjust control valve 98 to direct the second amount of air from air tank 78 to exhaust manifold 30. After adjusting the amount of air, controller 20 may return to step 216 of monitoring load parameters. In step 216, Controller 20 may perform processes similar to those discussed with respect to, for example, step 206. Controller 20 may proceed to step 212 after monitoring load parameters in step 216.

Returning to step 212, when controller 20 determines that the engine parameters meet or exceed the target engine parameters (Step 212: Yes), controller 20 may phase out the compressed air supply 218 from air tank 78. For example, controller 20 may adjust control valve 90 to decrease the first amount of air in passageway 94. Controller 20 may simultaneously or sequentially decrease the second amount of air in passageway 102 to reduce the acceleration of turbine stage 42 by the compressed air from air tank 78. In one exemplary embodiment, controller 20 may decrease the second amount of air before decreasing the first amount of air to reduce the possibility of any portion of the second amount of air from entering compressor stage 40 and causing a compressor surge.

In step 212, controller 20 may determine that no compressed air is required from air tank 78. Controller 20 may then close control valves 90 and 98 sequentially or simultaneously to stop supplying the first amount of air and the second amount of air from air tank 78 to exhaust manifold 30 and intake manifold 28, respectively. After closing control valves 90 and 98, controller 20 may open control valve 82 to allow compressed air from compressor 80 to flow through passageway 86 into air tank 78. Thus, controller 20 may use compressor 80 to charge air tank 78 during periods when compressed air from air tank 78 is not required for operation of engine 12. Controller 20 may monitor the first pressure of air within air tank 78. Controller 20 may close control valve 82 when the pressure of air within air tank 78 is about equal to or higher than a predetermined pressure. In one exemplary embodiment, the predetermined pressure may range between about 150 psi and about 200 psi.

It will be apparent to those skilled in the art that various modifications and variations can be made to the disclosed engine system. Other embodiments will be apparent to those skilled in the art from consideration of the specification and practice of the disclosed engine system. It is intended that the specification and examples be considered as exemplary only, with a true scope being indicated by the following claims and their equivalents.

What is claimed is:

1. A natural gas engine, comprising:
   a plurality of cylinders;
   an intake manifold configured to deliver air for combustion to the cylinders;
   an exhaust manifold configured to discharge exhaust from the cylinders;
   a fuel source configured to supply natural gas for combustion in the cylinders;
   an air tank in fluid communication with the intake manifold and the exhaust manifold;
   a first control valve disposed between the air tank and the intake manifold;
   a second control valve disposed between the air tank and the exhaust manifold;
   a first pressure regulator disposed between the air tank and the first control valve;
   a second pressure regulator disposed between the air tank and the second control valve;
   a controller configured to:
      direct a first amount of air from the air tank to the exhaust manifold based on a first electrical load;
      direct a second amount of air from the air tank to the intake manifold based on a second electrical load;
      adjust the first control valve to direct the first amount of air;
      adjust the second control valve to direct the second amount of air;
      control the first pressure regulator to regulate a pressure of the first amount of air; and
      control the second pressure regulator to regulate a pressure of the second amount of air; and
   a turbocharger, including:
      a turbine stage configured to be driven by at least one of the exhaust and the first amount of air; and
      a compressor stage coupled to the turbine stage, the compressor stage configured to direct a third amount of air from an ambient to the intake manifold.

* * * * *